Dec. 31, 1929.　　K. E. LYMAN ET AL　　1,741,856
AUTOMATIC TRANSMISSION
Filed July 9, 1928　　2 Sheets-Sheet 1
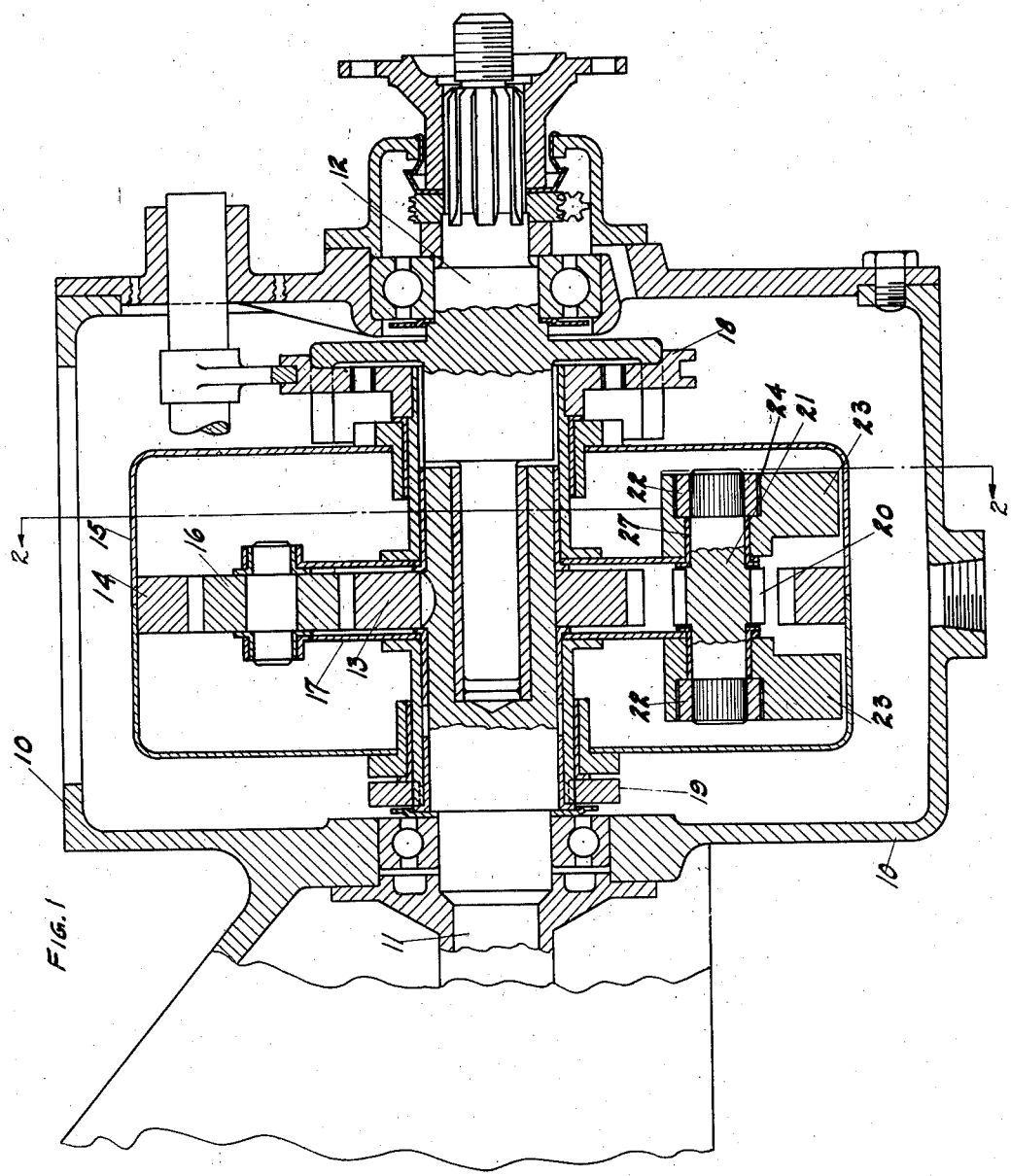
INVENTORS
KENNETH E. LYMAN
ALBERT M. LANE
BY
ATTORNEY Dec. 31, 1929.  K. E. LYMAN ET AL  1,741,856
AUTOMATIC TRANSMISSION
Filed July 9, 1928   2 Sheets-Sheet 2
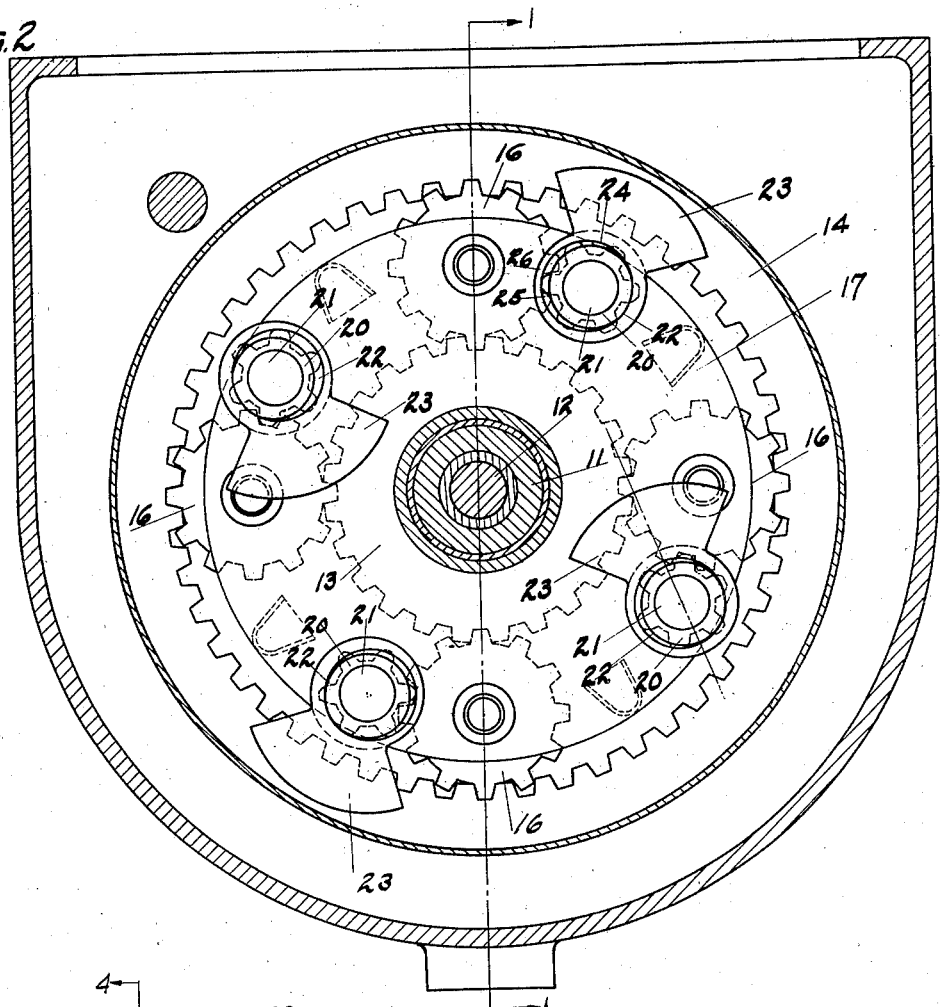
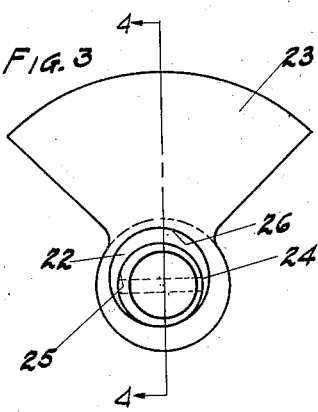
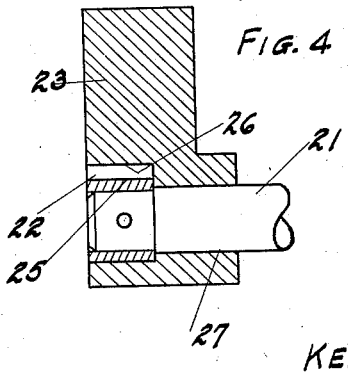
INVENTORS
KENNETH E. LYMAN
ALBERT M. LANE
BY
ATTORNEY Patented Dec. 31, 1929

1,741,856

UNITED STATES PATENT OFFICE

KENNETH E. LYMAN AND ALBERT M. LANE, OF ROCKFORD, ILLINOIS, ASSIGNORS TO AUTOMATIC TRANSMISSION COMPANY, OF ROCKFORD, ILLINOIS, A CORPORATION OF ILLINOIS

AUTOMATIC TRANSMISSION

Application filed July 9, 1928. Serial No. 291,297.

The present invention relates in general to means for transmitting a drive from a power source to an element to be driven and has particular reference to means for effecting a change speed ratio between the driving and driven elements, as for example, a driving shaft and a driven shaft.

The principal object of the invention is to provide an improved automatic change speed mechanism which is especially adapted for use in connection with motor vehicles. The invention is exemplified in the combination and arrangement of parts shown in the accompanying drawings and described in the following specification and it is more particularly pointed out in the appended claims.

In the accompanying drawings:

Fig. 1 is a vertical longitudinal section through a transmission constructed in accordance with the invention, taken on the line 1—1 of Fig. 2.

Fig. 2 is a vertical transverse section, taken on the line 2—2 of Fig. 1.

Fig. 3 is a detail face view of one of the weights and

Fig. 4 is a detail view in section of one of the weights taken on the line 4—4 Fig. 3.

The transmission includes a casing 10, a driving shaft 11, a driven shaft 12, a sun gear 13 secured to the driving shaft 11, a ring gear 14 secured to a cage 15, planet gears 16 journaled in a spider 17 and meshed with the sun gear 13 and the ring gear 14, a clutch mechanism 18 which is operable either to connect the ring gear 14 and the cage 15 with the driven shaft 12 or to connect the spider 17 with the driven shaft 12, and a back-stop mechanism 19 which is operable either to prevent the ring gear 14 and the cage 15 from turning backward when the spider 17 is connected with the driven shaft 12 or to prevent the spider 17 from turning forward when the ring gear 14 and the cage 15 are connected with the driven shaft. All of the parts which have been referred to thus far are found in precisely the same arrangement and relation in the application previously mentioned, and therefore need not be described in detail.

One of he distinctive features of the present invention consists in the employment of small supplemental planet gears 20 which are journaled in the spider 17 in mesh with the planet gears 16. The gears 20 are secured rigidly to shafts 21, and collars 22 are fastened to the ends of the shafts 21. Weights 23 are eccentrically journaled on the shafts 21, and releasable clutch means 24 are incorporated in the co-acting surfaces of the collars 22 and the weights 23, whereby to cause the weights to rotate as fast as the collars while allowing the weights to rotate faster than the collars throughout certain predetermined angles.

As a result of this supplemental planet gear arrangement, the weights 23 are caused to rotate much faster than the planet gears 16, and the rotation is in the opposite direction. As the weights are moved, centrifugal and inertia forces tend to retard the planetary movement, and such force is multiplied in the planetary gear train by reason of the differences in size between the gears 16 and 20.

When the weights 23 reach an inner position and commence to move outwardly, they are moved by centrifugal and inertia forces at a greater speed than the speed of revolution of the gears 20, and the releasable clutch means 24 permits the weights to advance with respect to the gears 20 under such conditions, thereby eliminating any acceleration of the planetary movement and permitting only retarding forces to act upon the same.

The releasable clutch means 24 is of novel construction, and serves to release the weights 23 from the collars 22 only throughout certain predetermined angles of travel. The collars 22 are provided with eccentric circular peripheries 25, and the inner peripheries 26 of the weights in co-action with the peripheries 25 of the collars are likewise eccentric with respect to the journaling surfaces 27 of the weights on the shafts 21. The shafts 21, the collars 22 and the weights 23 are assembled together in substantially the arrangement shown in Fig. 2, and as a result of such relative arrangement, the cooperating eccentric surfaces on the collars and weights release the weights from the collars only when the weights are in an inner position and pick up the weights again on the collars only when the weights reach an outer position.

Another outstanding feature of our invention resides in a construction and co-operative relationship of parts which will set up a substantially constant retarding effect in the planetary system throughout a wide range of variable speed ratios and with this retarding effect increased as the torque of the driving and driven shafts becomes more evenly balanced so that when the torque between the driving and driven shafts is substantially balanced the retarding effect will have been increased to a degree sufficient to produce a unitary drive through the system. This constant retarding effect in the planetary system is the result of utilizing both the inertia force of the weights and the centrifugal force.

If the centrifugal force alone was relied upon to develop the effect in the planetary system the retarding influence of the weights would be transmitted to the planetary system at frequencies which would likely develop undesirable pulsations in the drive unless of course, other means were incorporated to absorb or otherwise take care of such pulsations. With our simple and unusually effective mechanism we are assured of delivering a steady and uninterrupted drive through the transmission not only through a one to one drive, but through a wide range of variable speed ratios.

It is also interesting to note that the weights in our mechanism are capable of developing substantially maximum inertia forces and substantially minimum centrifugal forces at substantially maximum gear ratio and that the inertia forces gradually decrease and the centrifugal forces gradually increase as the system approaches a unitary drive.

Obviously those skilled in the art may make various changes in the construction and arrangement of parts without departing from the spirit and scope of the invention as defined by the claims hereto appended, and we therefore do not wish to be restricted to the precise construction contained herein.

Having thus described and shown an embodiment of our invention what we claim and desire to secure by Letters Patent of the United States is:

1. In an automatic transmission, a driving shaft, a driven shaft, a planetary gear train including a sun gear, ring gear, planet gear spider and planet gears connecting said shafts, weights mounted for eccentric rotation, and connecting means between the weights and the planet gears for causing the weights to rotate faster than the planet gears.

2. In an automatic transmission, a driving shaft, a driven shaft, a planetary gear train including a sun gear, ring gear, planet gear spider and planet gears connecting said shafts, weights mounted for eccentric rotation, and connecting means between the weights and the planet gears for causing the weights to rotate in the opposite direction from the planet gears.

3. In an automatic transmission a driving shaft, a driven shaft, a planetary gear train including a sun gear, ring gear planet gear spider and planet gears connecting said shafts, weights mounted for eccentric rotation, and connecting means between the weights and the planet gears for causing the weights to rotate faster than the planet gears and in the opposite direction from the planet gears.

4. In an automatic transmission, a driving shaft, a driven shaft, a planetary gear train including a sun gear, a ring gear, a planet gear spider and planet gears connecting said shafts, supplemental planet gears of smaller size journaled in said spider in mesh with said main planet gears, weights, pivotally associated with said supplemental planet gears, and means for limiting the pivotal movement of the weights with respect to said supplemental planet gears.

5. In an automatic transmission, a driving shaft, a driven shaft, a planetary gear train including a sun gear, a ring gear, a planet gear spider and planet gears connecting said shafts, supplemental planet gears of smaller size journaled in said spider in mesh with said main planet gears, weights eccentrically associated with said supplemental planet gears, and means for causing said weights to rotate in advance of said supplemental planet gears throughout only a predetermined angle.

6. In an automatic transmission, a driving shaft, a driven shaft, a planetary gear train including a sun gear, a ring gear, a planet gear spider and planet gears connecting said shafts, supplemental planet gears of smaller size journaled in said spider in mesh with said main planet gears, weights pivoted concentrically with said supplemental planet gears and having eccentric surfaces and collars rigidly associated with said supplemental planet gears and having eccentric surfaces for co-action with the eccentric surfaces of said weights whereby to permit a limited pivotal movement of said weights with respect to said supplemental planet gears.

7. In a transmission, driving and driven elements, speed changing mechanism for connecting said elements in variable driving ratios, a motion transmitting planet gear in said mechanism through which the drive is imparted from the driving element to the driven element and means for automatically changing the driving ratio, comprising a centrifugal weight mounted to develop substantially maximum inertia forces and substantially minimum centrifugal forces when the change speed mechanism is operating in a gear ratio, a control transmitting connection between said weight and said planet gear and means contributing to the mounting for said weight for decreasing said inertia forces and increasing said centrifugal forces as the change speed mechanism approaches a one to one drive.

8. In a transmission, driving and driven elements, speed changing mechanism connecting said elements, a motion transmitting member in said mechanism, and means for automatically controlling said mechanism, comprising a centrifugal weight eccentrically mounted relatively to said motion transmitting member and an operating connection between said weight and said member comprising a camming device.

9. In a transmission, driving and driven elements, speed changing mechanism connecting said elements, a motion transmitting planet gear in said mechanism and means for automatically controlling said mechanism, comprising a centrifugal weight and a connection between said weight and said planet gear, comprising a pinion meshing with said planet gear, a shaft for said pinion and an eccentric connection between said weight and said shaft.

10. In a transmission, driving and driven elements, speed changing mechanism connecting said elements, a motion transmitting planet gear in said mechanism and means for automatically controlling said mechanism, comprising a centrifugal weight and a connection between said weight and said planet gear, comprising a pinion meshing with said planet gear, a shaft for said pinion and a releasable clutching device connecting said weight and said shaft.

11. In a transmission, driving and driven elements, a planetary gear system, including a motion transmitting planet gear, connecting said elements and means for automatically developing a substantially constant retarding effect in the planetary movement of the said system and operable to progressively increase said retarding effect as the difference in torque and speed between the driving and driven elements decreases, comprising a rotatable speed responsive device mounted for rotation in a direction opposite to that of the rotation of said planet gear, a connection between said planet gear and said device and a connection positively connecting said device with said planet gear throughout only certain predetermined angles of rotation of said device.

12. In an automatic transmission, a driving element, a driven element, planetary change speed mechanism for connecting the driving and driven elements in different speed ratios, a planetating motion transmitting member in said mechanism and means for automatically controlling the planetating movement of said member for changing the ratio in the mechanism, comprising a centrifugal weight mounted to rotate in a direction opposite to that of the planetating motion transmitting member and an automatic intermittent clutch contributing to a connection between said weight and said motion transmitting member.

13. In an automatic transmission, driving and driven elements, planetary change speed mechanism for connecting said elements in different speed ratios, a planet shaft in said mechanism, a planet gear on said shaft and means for controlling the planetating movement of said planet gear for automatically controlling the mechanism, comprising a centrifugal weight mounted to rotate in a direction opposite to that of the planetating motion transmitting member and an automatic intermittent clutch connecting said weight with said planet shaft.

14. In an automatic transmission, driving and driven elements, planetary change speed mechanism for connecting said elements in different speed ratios, a planet gear in said mechanism, a shaft for said planet gear and means for automatically controlling said mechanism, comprising a centrifugal weight mounted to rotate in a direction opposite to that of the planetating motion transmitting member and means for automatically connecting said weight with said planet shaft when the weight reaches an outer position and automatically releasing the weight from the shaft when the weight reaches an inner position.

15. In a transmission, driving and driven elements, speed changing mechanism for connecting said elements in variable driving ratios, a planetary motion transmitting member in said mechanism through which the drive is imparted from the driving element to the driven element and means for automatically controlling said mechanism, comprising a centrifugal weight for influencing the rotation of said planetary motion transmitting member about its own axis and a gear contributing to said connection for increasing the effective leverage of the weight relatively of said planetary motion transmitting member.

In testimony whereof we have hereunto subscribed our names.

KENNETH E. LYMAN.
ALBERT M. LANE.